United States Patent [19]

Greeson, Jr.

[11] 3,851,211

[45] Nov. 26, 1974

[54] SUSTAIN SEQUENCE CIRCUITRY FOR GAS PANEL DISPLAY DEVICES

[75] Inventor: James C. Greeson, Jr., Woodstock, N.Y.

[73] Assignee: International Business Machines Corporation, Armonk, N.Y.

[22] Filed: June 28, 1973

[21] Appl. No.: 374,590

[52] U.S. Cl.... 315/169 TV, 315/169 R, 340/324 M

[51] Int. Cl. .......................................... H05b 37/00

[58] Field of Search.................. 315/169 TV, 169 R; 340/324 M

[56] References Cited

UNITED STATES PATENTS

| | | | |
|---|---|---|---|
| 3,157,824 | 11/1964 | Jones | 315/169 R |
| 3,573,542 | 4/1971 | Mayer et al. | 340/324 M X |
| 3,771,016 | 11/1973 | Toba et al. | 315/169 TV |

*Primary Examiner*—Alfred E. Smith
*Assistant Examiner*—Lawrence J. Dahl
*Attorney, Agent, or Firm*—Douglas R. McKechnie

[57] ABSTRACT

A gas panel display apparatus is operative to write, sustain and erase information selectively. Each line of the gas panel is associated with a plurality of segments and, during a sustain sequence, the line drivers are cycled so that only one segment at a time is in a sustain sense while any other segments associated with the line are neutral. The line driver peak current specification is thus reduced below the maximum number of lines that a given line crosses. Additionally, the lines are driven during a sustain sequence so that only every other cell along the line is undergoing a sustain sense while the remaining cells are neutral. Thus, each cell in the panel in a sustain state is electrostatically shielded by the orthogonally adjacent neutral cells.

1 Claim, 18 Drawing Figures

FIG. 4
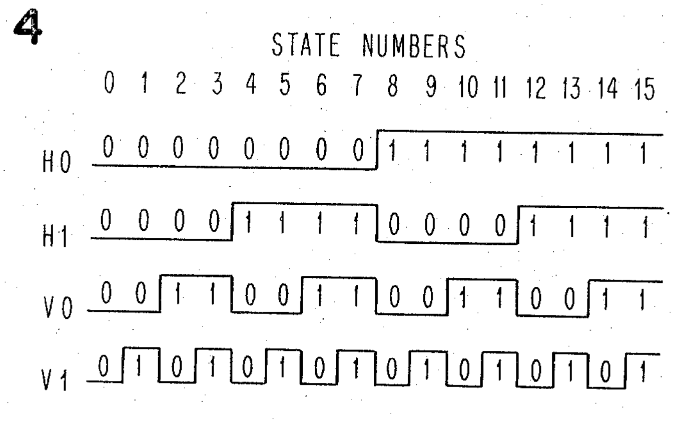
FIG. 5
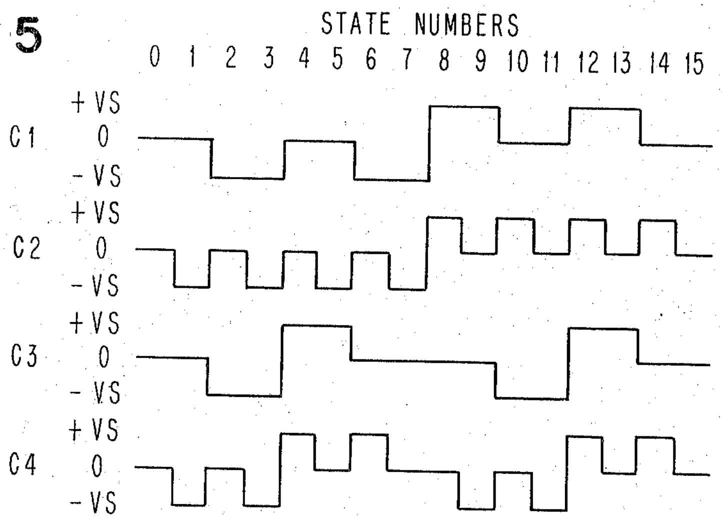
FIG. 6
STATE NUMBERS
| | | V0 V1 | | | |
|---|---|---|---|---|---|
| | | 00 | 01 | 11 | 10 |
| H0 H1 | 00 | 0 | 1 | 3 | 2 |
| | 01 | 4 | 5 | 7 | 6 |
| | 11 | 12 | 13 | 15 | 14 |
| | 10 | 8 | 9 | 11 | 10 |

SUSTAIN SEQUENCE CIRCUITRY FOR GAS PANEL DISPLAY DEVICES

BACKGROUND OF THE INVENTION

1. Field of the Invention

This invention relates to gas panel display devices and, more particularly, to improvements in the method and apparatus for applying sustain signals to a gas display panel.

2. Description of the Prior Art

As is known, a gas panel display device may be used as a slave output device in a data processing system for displaying information in the system. In general, the data processing system controls the operation of the display device by sending to the device data signals representing the information to be displayed and command signals, such as write and erase, which cause the information to be displayed and to be erased or obliterated. The device may also receive other commands of a more specialized nature but these commands will not be discussed since the invention is concerned with the general basic operations of writing, sustaining and erasing information displayed by the device.

A display device comprises a gas display panel, a data flow path for the information to be displayed, and a control section for operating the display panel in accordance with commands received from the data processing system. An example of a display device is disclosed in U.S. Pat. No. 3,559,190 D. L. Bitzer et al. The display device generally includes a sealed glass envelope containing an illuminable or ignitable gas. Electrodes or lines are imbedded in front and back members of the envelope with the electrodes in one member being at right angles to the electrodes of the other member to form a multiplicity of ignitable cells at the intersections. The electrodes are covered by dielectric layers.

In accordance with the generally accepted theory of operation, the display or visual characteristics of a cell are a function of the potential applied across the cell by the electrodes and a potential due to a wall charge that is built up on the dielectric walls between the electrodes. The characteristics are also a function of the past history of how a series of applied signals has been applied to the cell. The usual mode of operation is to apply sustain signals to the electrodes, a sustain signal being oppositely phased potentials applied to the electrodes defining a cell which develop an applied potential across the cell below the firing or ionization potential at which the cell gas ionizes. Successive sustain signals are applied alternately in opposite positive and negative senses in order that when a cell has been once fired, the wall charge that develops as a result thereof can be used to fire the cell on the next sustain signal of opposite sense. Write and erase signals are applied usually in only one sense, e.g., positive, so that the order of application of the positive and negative signals is important.

In order to ignite or write a cell, a potential is developed across the cell greater than the ionization potential of the gas, the potential being developed either as a result of a separate write signal at the required potential or a separate write signal which is additively combined with the sustain signal to develop the full write signal. When a potential is applied to the cell above the ionization or firing potential, there is a slight delay before the gas ionizes or ignites at which time a momentary flash of light develops. As current flows through the cell, a wall charge is built up which extinguishes the cell. Once a cell has been ignited, sustain signals can be applied as described above to repetitively fire the cell where the degree of brightness from an individual cell is proportional to the frequency of the sustain signals, along with the physical parameters of the envelope, electrodes and gas. In order to extinguish or erase a cell, it is necessary that the wall charge be dissipated or reduced below the level at which it would cause the cell to fire upon the application of the appropriately sensed sustain signal. An erase signal is used to do this and it is a signal of a short duration or amplitude or both designed to dissipate the wall charge and drop its corresponding potential below the critical level.

In order to apply the signals to the electrodes, a series of drivers are used, there being one driver for each electrode or line of the display. While there are many different drivers known within the prior art, a specific example is disclosed in the co-pending application Ser. No. 261,773, filed June 12, 1972 by D. G. Kleen et al. for "Co-Packaged All-Solid-State Low Level Coupling and Drive Control Circuits For Gas Discharge Display Panel" and assigned to the assignee of the present application. Each electrode or line is connected to a driver and the peak current associated with a given driver is proportional not only to the capacitance of the lines at each cell but also to the total number of lines which the individual line crosses. That is, with a given geometry and capacitance of a cell, the current within a line is proportional to the number of cells that are fired during each sustain signal with the maximum peak current being developed if all of the cells which a given line helps to define, ignite during a sustain signal.

In general, the trend in the development of gas panel displays has been to provide larger displays of finer resolution. The degree of resolution is proportional to the density of the cells. While the aforementioned patent to Bitzer et al describes a device in which individual cells are provided within the panel envelope, other panels are known in which the display envelope is open within the gas chamber so that the cells are formed between the electrodes. Here, it should be obvious that finer degrees of resolution are obtained only by spacing the electrodes closer and closer together.

As the density of the electrodes increases, there is a greater chance that the signals on one line could adversely affect adjacent cells. To overcome this problem, the panel can be constructed as disclosed in U.S. Pat. No. 3,666,981 for "Gas Cell Type Memory Panel With Grid Network For Electrostatic Isolation" in which the lines and signals are so arranged as to provide for the electrostatic isolation of individual cells. This is done by arranging a network of additional electrodes or lines between the lines defining the cells and maintaining the network at a neutral potential relative to the cells to electrostatically isolate each one. Reference may be had to the patent for a more detailed description.

A principal factor concerned with the practical utilization of a gas panel display device is the cost of components. As the trend is towards larger display panels of finer resolution, a cost factor that becomes of concern is one connected with the matrix drivers which supply the signals to the lines. Here, a significant cost is connected with the peak current to which drivers have to be designed. As the number of cells serviced by each line might increase due to a greater density, then the cost of each driver will go up until some point might be reached at which the panel becomes impractical. The invention is concerned with a way to minimize peak currents, and thus hold down cost, while at the same time allowing greater density of the lines and providing higher resolution.

SUMMARY OF THE INVENTION

One of the main objects of the invention is to provide a gas panel display device having an improved sequence of application of sustain signals for reducing the peak current specifications of the line drivers.

Another object is to achieve the foregoing object in gas panel display devices utilizing electrostatic shielding, as disclosed in the aforementioned U.S. Pat. No. 3,666,981.

Briefly stated, the manner in which the above and other objects and advantages of the invention are achieved is to divide the panel and matrix of lines into a plurality of segments where each line tranverses more than one segment. The sustain signals are applied in such a manner that, for a given line, only those cells associated with a single segment can be fired. This then reduces the peak current associated with the line from being proportional to the total number of cells on the line to that of being proportional to the total number of cells being fired in the largest segment. In addition, sustain signals are applied so that those cells which are orthogonally adjacent to a cell being fired, are at a neutral potential so as to electrostatically shield the fired cell.

BRIEF DESCRIPTION OF THE DRAWINGS

The foregoing and other objects, features and advantages of the invention will be apparent from the following more particular description of the preferred embodiment of the invention, as illustrated in the accompanying drawings.

FIG. 4 is a schematic diagram showing the various states of the lines of FIG. 3;

FIG. 5 is a diagram similar to FIG. 4 showing the bias states of the cells shown in FIG. 3;

FIG. 6 is a table illustrating nomenclature for the different states;

DETAILED DESCRIPTION

Figures 1, 2, 3:
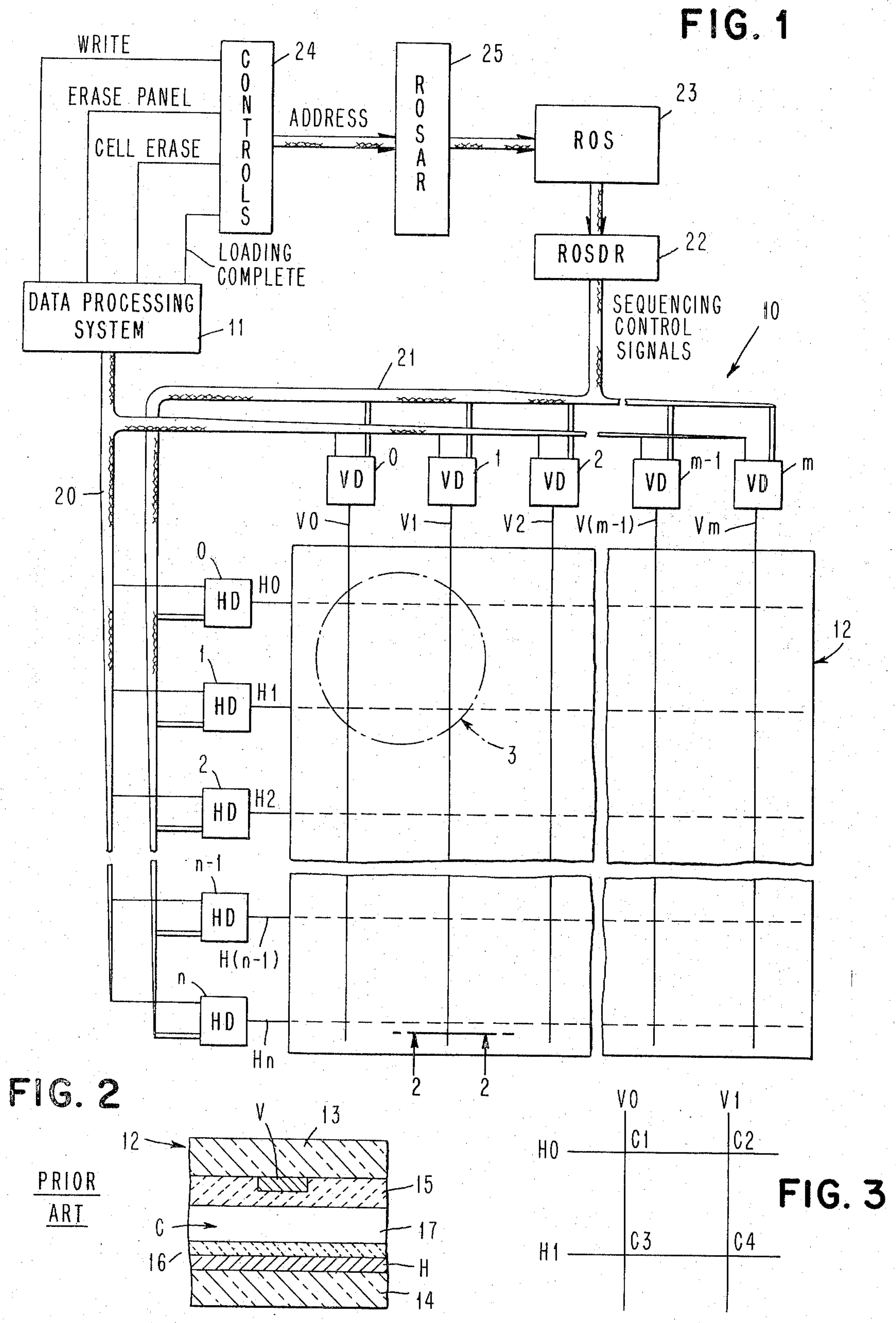
FIG. 1 is a schematic diagram of a gas panel display system embodying the invention.
FIG. 2 is a cross-sectional view along lines 2—2 of FIG. 1 showing the physical construction of a gas panel cell in accordance with known construction.
FIG. 3 is a schematic diagram of a plurality of cells generally taken in the area of reference circle 3 in FIG. 1, which diagram is useful for understanding nomenclature used in the description.

Referring now to the drawings and first to FIG. 1, gas panel display apparatus 10 is connected as a slave or output device to a conventional data processing system 11 for displaying information associated with the system. Apparatus 10 includes a gas panel 12 of known or conventional construction. In the general operation of the system, apparatus 10 is under the general control of the data processing system 11 which sends command signals to apparatus 10 along with data signals representing the information to be displayed. The command signals may include commands such as "write" which would cause data supplied to apparatus 10 to be displayed, "erase panel" which causes the entire panel to be erased, "cell erase" which allows selective cells to be erased, and "loading complete" which would occur as a preliminary to the write or cell erase operations in which latches associated with the panel drivers are loaded with the information for controlling the state of individual display cells.

With reference to FIG. 2, panel 12 is of any suitable known construction and includes front and back glass panels 13 and 14, orthogonal electrodes V and H having dielectric layers 15 and 16 therebetween, and an illuminable gas 17 disposed in the space between the electrodes and dielectrics. Cell C is defined thereby.

With reference again to FIG. 1, gas panel 12 includes a series of vertical electrodes Vo–Vm and a series of horizontal electrodes Ho–Hn arranged in an orthogonal manner so as to form a series of display cells at the orthogonal intersections of the electrodes or lines. The electrodes are spaced sufficiently close to provide the area density for achieving the desired degree of resolution. The vertical lines are connected to a series of vertical drivers VDo–VDm and the horizontal lines are connected to a series of horizontal drivers HDo–HDn. These drivers are in turn connected by a bus 20 to receive data from the data processing system 11 and by a bus 21 to receive sequencing control signals from the read only storage data register (ROSDR) 22 of a read only storage (ROS) 23. The purpose of ROS 23 is to store the signals for activating or controlling the drivers so as to allow the gas panel 12 to be operated. It should be appreciated that the drivers may be of known or conventional construction and that the manner in which the control signals fed thereto are derived can come from use of a read only store such as is disclosed herein, from suitable hardwire control logic or from a general purpose or special purpose data processing systems. In any event, the ROS 23 and related elements provide a known type of microprogram control over the drivers in the manner disclosed in detail hereafter. The commands from data processing system 11 are received by control 24 which provides addresses to a read only storage address register (ROSAR) 25 so as to cause ROS 23 to read out the desired signals for performing the appropriate functions.

The lines V and H and cells C of panel 12 are segmentized both logically and geometrically as to the manner in which the signals are applied thereto. In accordance with this segmentation, as illustrated in FIG. 3, the vertical lines are arranged in pairs shown with reference to lines V0 and V1 and horizontal lines are arranged in pairs H0 and H1 to form cells C1–C4. The entire panel is arranged in this manner so that all similar cells, e.g., cell C1, form a segment. In order to minimize the peak current, the lines or pairs can be physically separated and placed anywhere on panel 12. However, in order to provide for the electrostatic isolation, the pairs of lines should be adjacent for reasons apparent hereafter. While the remaining discussion deals primarily with the relationships of lines V0, V1 and H0, H1 and the drivers and cells associated therewith, it is to be understood that these relationships apply to the remaining lines and cells throughout the panel.

The drivers to which the lines are connected are capable of applying potentials to the lines in a digital fashion, that is that the line is either up or down, positive or negative, relative to some reference potential, and can simply be represented as in a zero or one condition as shown in FIG. 4. FIG. 4 illustrates the various different potentials that can be applied to the lines, each different combination of potentials being identified by number 0–15 representing the different states. For the different states of potentials on the electrodes of the cells in FIG. 3, the potentials at the cells is shown in FIG. 5 where each cell would be either at a 0 potential difference level, a positive sustain voltage VS level or a negative sustain voltage-VS level. The cell bias plus the history of the panel determines the states of the four sections or segments of the panel.

Figure 7:
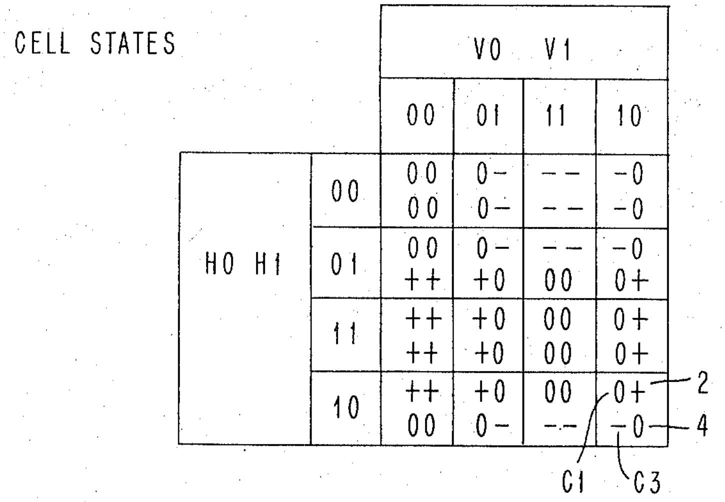
FIG. 7 is a table similar to FIG. 6 showing the different cell bias states associated with the different states.

FIGS. 6 and 7 illustrate the manner, used hereafter, for identifying the cell states and state numbers. The binary condition of the respective lines can be taken to be the binary equivalent of the state number where H0 and H1 form the leftmost two digits and V0, V1 form the rightmost two digits. Thus, the number 0101 is the binary equivalent to state number 5, as shown in FIG. 6. Similarly the condition of the different cells for the respective states is shown in FIG. 7 where, with reference to the lower righthand box, the upper lefthand digit represents the condition of cell C1, the upper right-C2, the lower left-C3 and the lower right cell -C2, the lower left -C3 and the lower right cell -C4. With these tables, the cell conditions and line potentials in the various states can be readily determined. For example, when the cells are in state 8, cells C1 and C2 are in positive sustain states, and cells C3 and C4 are at the 0 levels. To accomplish this, it is necessary that line H0 be in a 1 condition, H1 be in a 0 condition and a V0 and V1 be in 0 conditions.

FIG. 6 also illustrates the manner in which the various states can be sequenced through by changing the potential level on only one line at a time, and the manner in which a degree of wrap around is achieved. For example, to go from state 0 to state 1, only the potential on line V1 need be changed. That is, in order to go from one state to the state in any orthogonally adjacent box, it is necessary to change the potential on only one line and, when the end of a row or column is reached, the state at the opposite end is acheived by again changing only one line, in wrap around fashion. For example, to go from state 2 to state 0 only line H0 need be changed and to go from state 2 to state 10 or vice versa, only line H0 need be changed.

Figure 8:
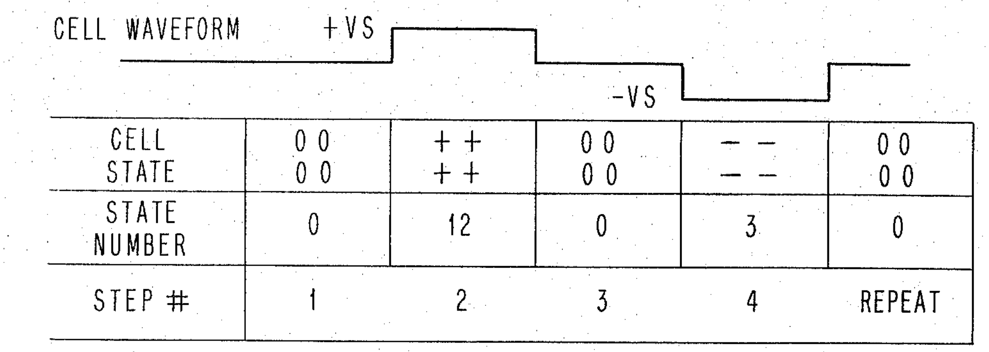
FIG. 8 is a diagram illustrating the sustain sequence of the prior art and how it would be applied to the cells of FIG. 3.

In order to better understand the invention, let us assume for the moment that the cells and lines can be put through a sustain sequence in a manner similar to that done within the prior art. FIG. 8 illustrates a simple way to accomplish this by means of a four step sequence which proceeds through state numbers 0, 12, 0, 3 and then repeats. The cell waveform is shown at the top of FIG. 7 and for each cell, the waveform would go through a positive sustain cycle at a potential +VS and then through a later negative sustain cycle at a potential of −VS. Two things should be noted about this. The first is that since all cells are simultaneously put through a like cycle, the peak current associated with the driver on any one line is a function of the number of other lines that it crosses so that it would be at a maximum when all cells along that given line simultaneously fire or should fire. Second, since all cells are at the same level, there is a danger of unwanted firings occurring which would distort the image presented by the panel. The second problem is the same as that to which the aforementioned U.S. Pat. No. 3,666,981 is directed.

Figure 11:
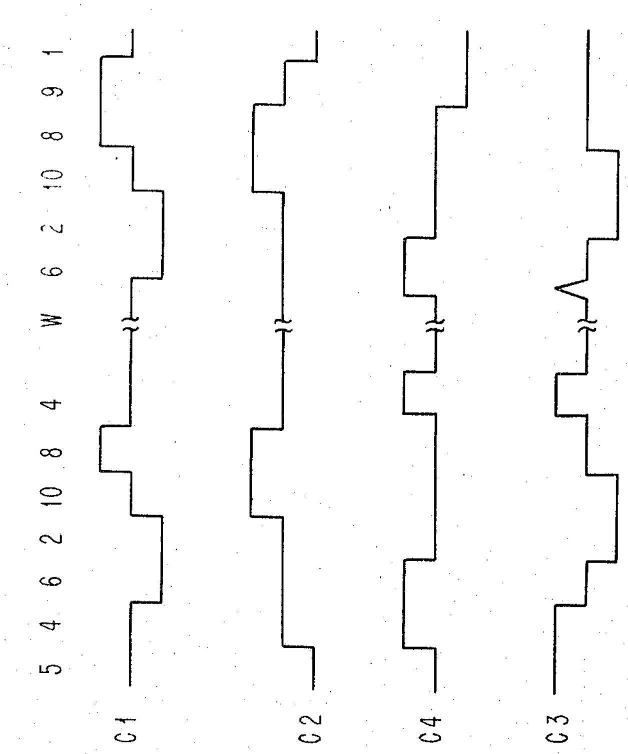
FIGS. 9, 10 and 11 are schematic diagrams of the waveforms associated with the cells when sequenced to perform sustain, erase and write functions respectively.
Figure 10:
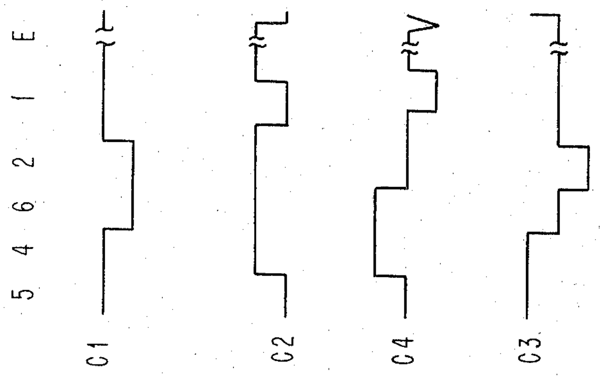
Figure 9:
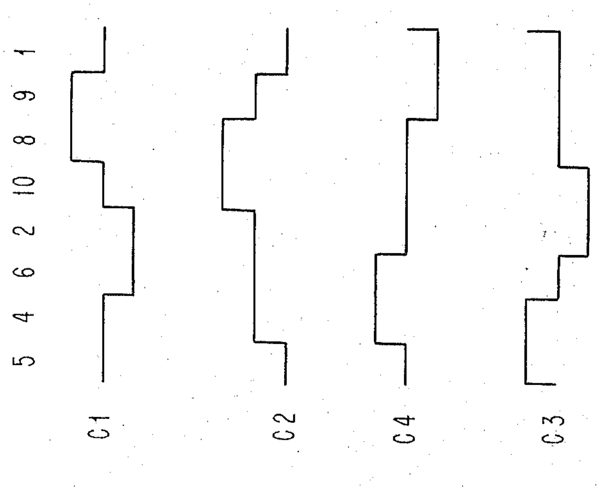

It should be apparent that not all states of the cell can be readily used and that some provide no advantage over existing known methods. Let us assume that the objectives for a beneficial or advantageous sequence are threefold, namely, halving or reducing the peak current associated with the driver and any one line, a minimum displacement current which indicates that only the potential on one line at a time may be changed, and electrostatic shielding. One sustain sequence for accomplishing such objectives is illustrated in FIG. 9 where the sustain sequence comprises the series of states 5, 4, 6, 2, 10, 8, 9, and 1, the sequence being repeated while the device is in a sustain mode. In accordance with this sequence, the cells would be fired in the following senses and order for the respective cycles, C3+, C4+, C1−, C3−, C2+, C1+, C4− and C2−. FIGS. 10 and 11 similarly show the erase and write sequences.

Figure 12:
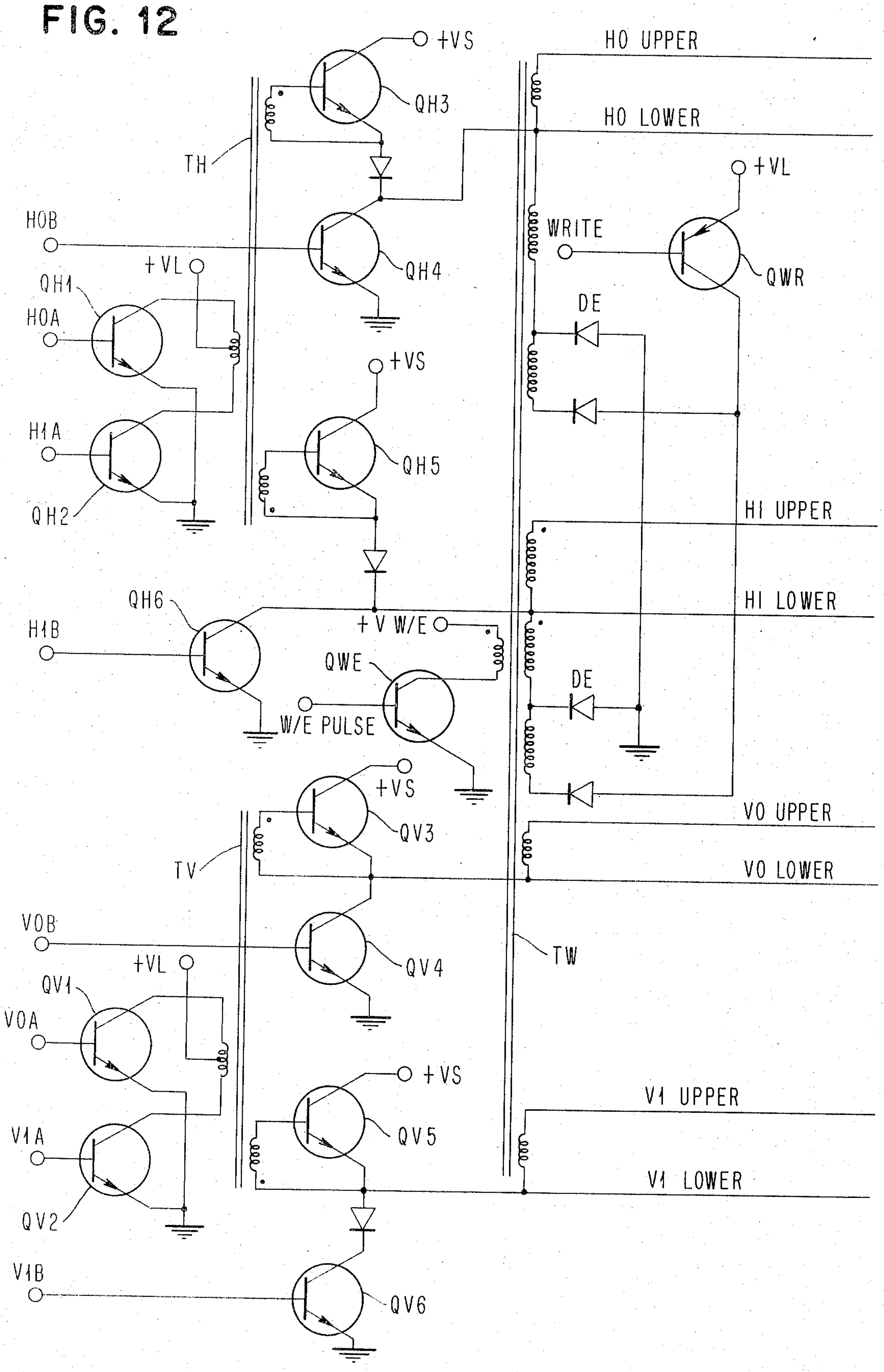
FIG. 12 is a circuit diagram of one way to implement the sequencing circuits.

FIG. 12 shows the driving circuits for use in the preferred embodiment of the invention. The details of these circuits form no part of the present invention and are described in detail in the aforementioned U.S. application Ser. No. 261,773. Reference may be had thereto for details not described herein. The circuits shown in FIG. 12 work the same as in the application except that four drivers are arranged as shown for driving the segmentized lines such as shown in FIG. 3. The output to the upper and lower busses for controlling the lines appears at the right side of the circuit in FIG. 12. A write signal is applied to transistor $Q_{WR}$, a write/erase (W/E) pulses applied to transistor $Q_{WE}$ and the various other input pulses are applied at the left of the circuits shown in FIG. 12, for the purpose of sequencing the gas panel through the sustain, write and erase functions in a manner described more in detail hereafter. Note that the "B" suffix input, for example $H_{0B}$, if driven positive will connect the lower buss associated therewith to ground. When driven negative (the zero level), the device is off and the lower buss is disconnected from ground. The "A" suffix inputs, for example $H_{0A}$, operating through an associated transformer, for example $T_H$, can (for a limited period of time) connect a lower buss (through for example, $Q_{H3}$ and its associated diode) to a DC power supply labeled +VS. When both the "A" suffix input and the "B" suffix input are at zero the respective lower buss can be thought of as disconnected from the sustain supply, +VS. When this disconnection is accomplished, the lower buss can be referenced, for example, through the secondary tiedowns of transformer $T_W$ which can be spontaneous through the diode marked $D_E$ or logically operated transistor $Q_{WR}$.

Figure 13:
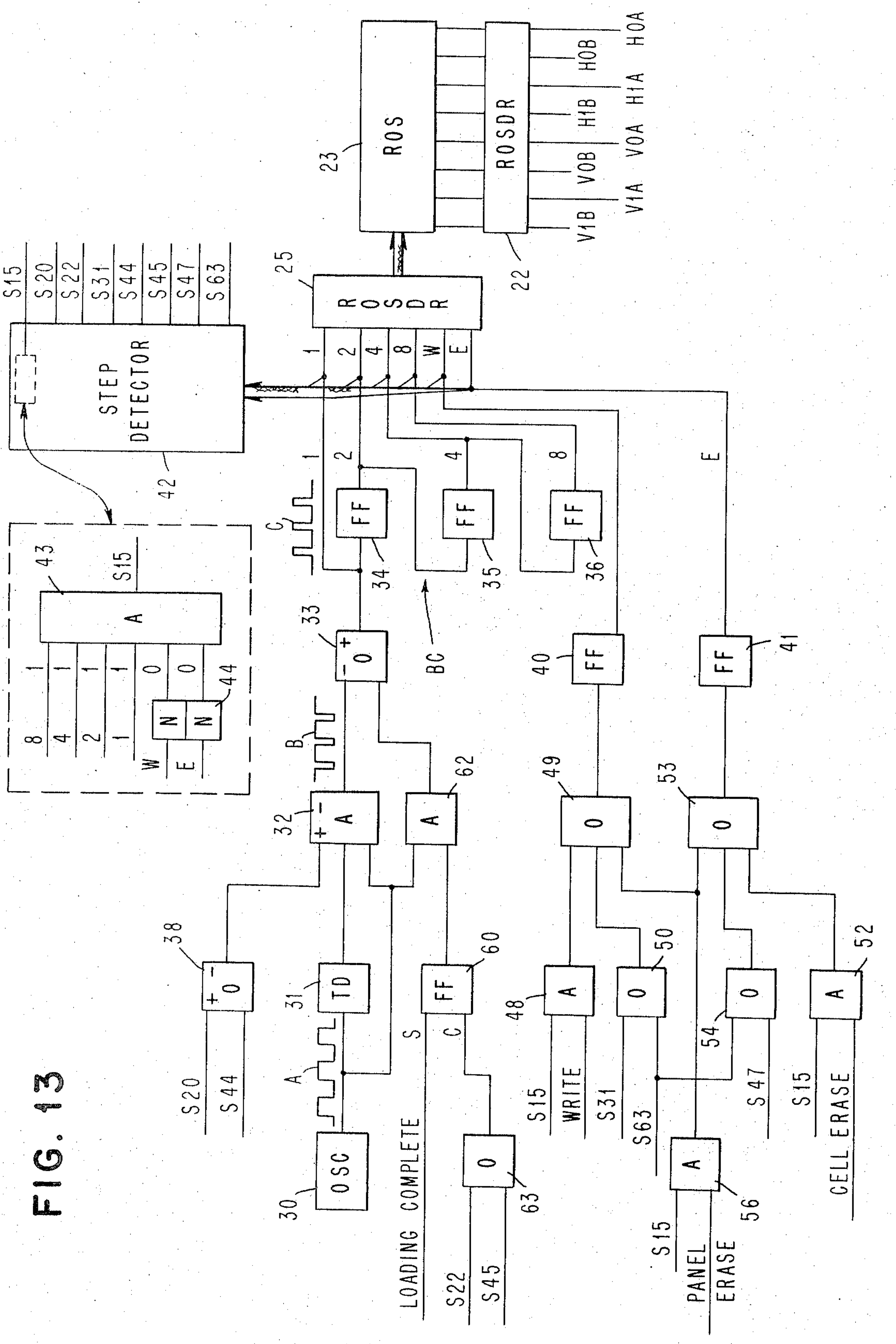
FIG. 13 is a combined logic block diagram of an exemplary way to implement the sequencing controls shown in FIG. 1.
Figure 15:
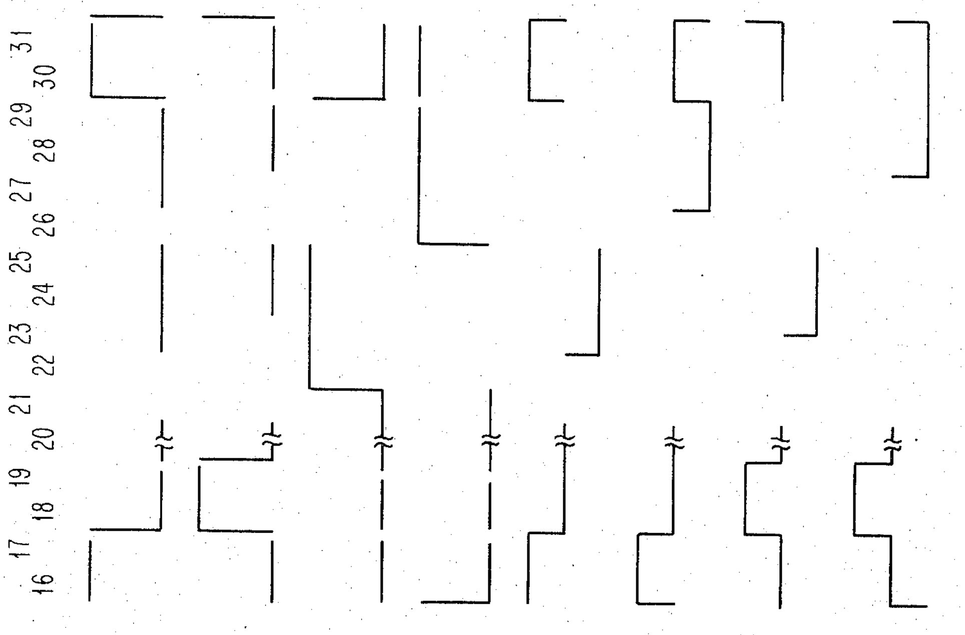
FIGS. 14–17 respectively show waveforms sequences associated with performing the sustain, write, cell erase and panel erase functions of the preferred embodiment of the invention.
Figure 14:
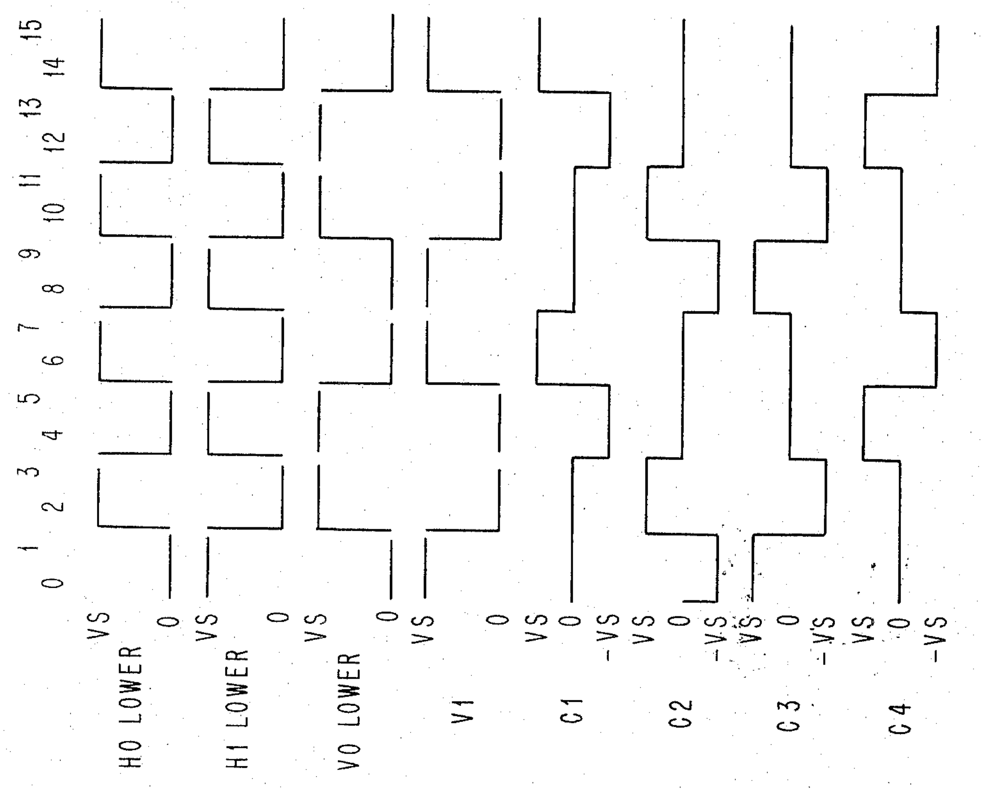
Figure 17:
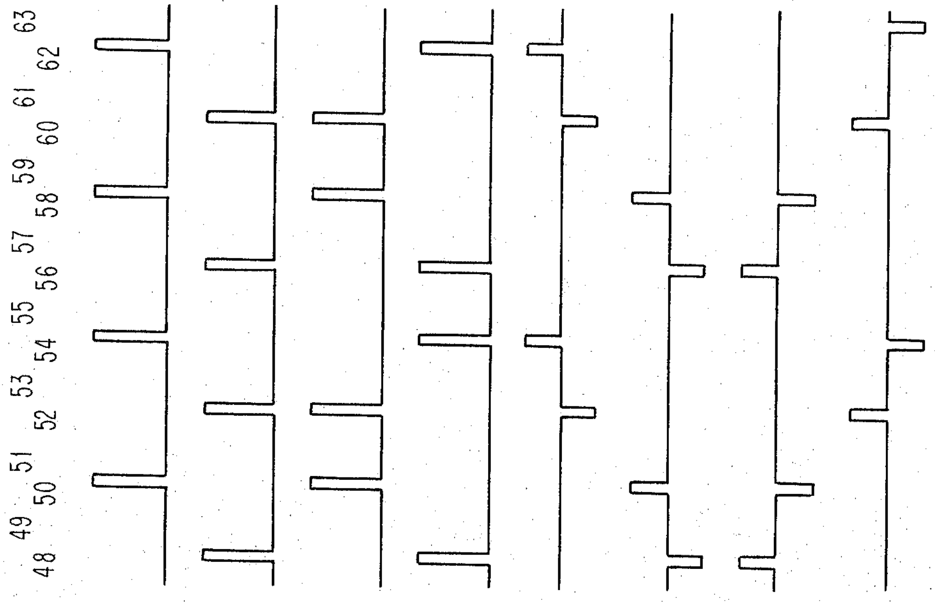
Figure 16:
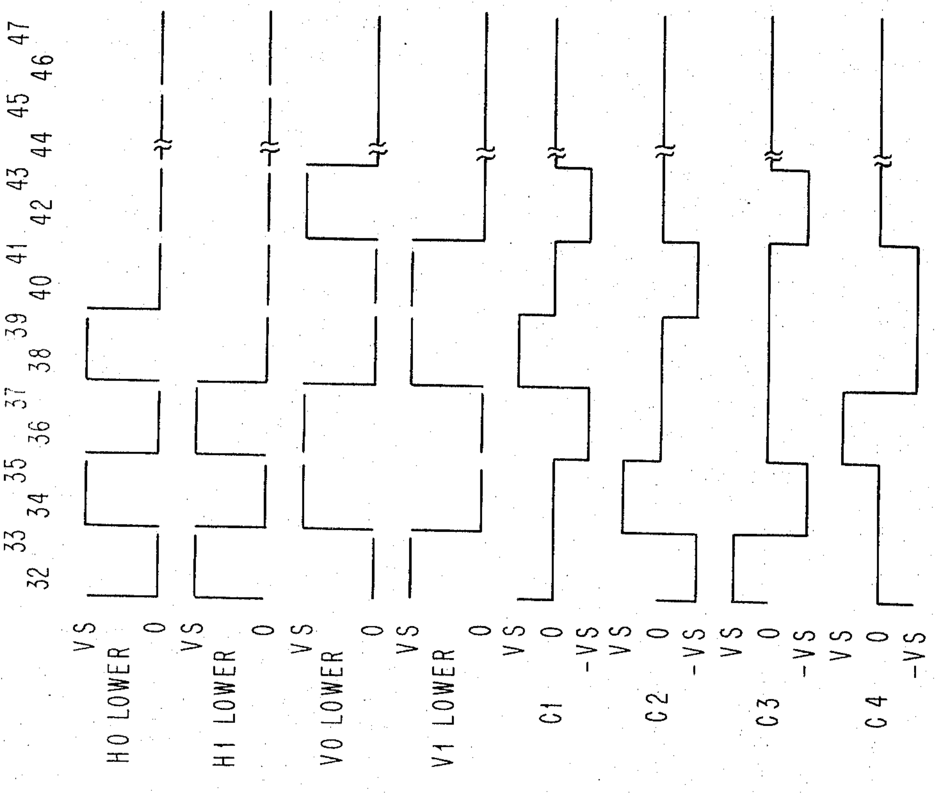

FIG. 13 shows in more detail controls 24 for operating ROS 23 to provide sequencing control signals. An oscillator 30 provides the bias timing signals A for controlling the system. The output of oscillator 30 is fed to a time delay (TD) 31 whose output is fed to an And circuit 32. This circuit also receives as input a direct connection from the output of oscillator 30 and an output from an OR circuit 38. Or circuit 38 is used to interrupt the basic operation of the ROS 23 during steps 20 and 44. At times other than during these steps, the output of circuit 38 is positive. The effect of TD 31 is to introduce a time delay which, when recombined by AND circuit 32, provides a series B of negative spikes or pulses that are inverted by Or circuit 33 and to form waveform C that is applied to a binary counter (BC). This counter comprises three flip flops (FF) 34–36 and a line 37. The output of FF 34 is fed to ROSAR 25 and is also fed as an input to FF 35. Similarly, the output of FF 35 is fed as an input to ROSAR 25 and as an input to FF 36 whose output is also fed to the ROSAR. BC provides a 16 position binary count that wraps around. In addition to the above lines identified in FIG. 13 as providing respectively one, two, four and eight inputs to ROSAR, write and erase address bits W and E are also provided which come from flip flops (FF) 40 and 41 respectively.

The sequencing controls are designed to cycle through 64 steps numbered 0–63. Steps 0–15 comprise the normal sustain cycle. Steps 16–31 comprise the write cycle, steps 32–47 comprise the cell erase cycle and steps 48–63 comprise the panel erase cycle, the details of which will be described when considering FIGS. 14–17. The basic frequency of oscillator 30 is directly related to the frequency of operation of ROS 23 so that on subsequent cycles, different addresses are applied to ROSAR 25 to produce the outputs of ROSDR 22 described below.

A step detector 42 is connected to receive the addresses applied to ROSAR 25 to thereby detect when certain steps occur. For each step to be detected, special circuitry is used such as that illustrated with reference to detecting step 15 and producing a signal S15 indicative thereof. To do this, an And circuit 43 has six inputs corresponding to the address inputs. The two inverters 44 are connected to the W and E lines respectively so that a positive output signal S15 will appear only when the signals on the addressing lines represents step 15 and are respectively in a 111100 condition as shown in FIG. 13. In a similar manner the various other steps may be detected to provide the signals shown.

The apparatus normally cycles through sustain sequences until a command is received asynchronously. The sustain sequence is not interrupted in the middle but is allowed to complete through step 15 whereupon the sequencing controls then go through a sequence depending upon the desired command. Thus, when a write command is received, it is latched up and an And circuit 48 receives as inputs the write command and S15. Thus, when step 15 is reached, the signal is produced by And circuit 48 that is fed through Or circuit 49 to actuate the binary trigger or flip flop 40 and produce the W signal for sequencing through the write sequence. At the end of the sequence in step 31, an S31 signal is detected and is fed through Or circuit 50 and 49 to reset flip flop 40 which changes the W signal to a 0 and thereby causes the next step to be taken to be step 15. Similarly, "cell erase" signal is fed through an And circuit 52 in conjunction with S15 and this is used or fed through Or circuit 53 to produce a signal that actuates binary flip flop 41 to produce the E signal. The E signal is terminated at step 47 when signal S47 is fed to Or circuit 54 to produce a signal that is fed through Or circuit 53 to reset flip flop 41. Similarly, "panel erase" signal and S15 are fed to And circuit 56 whose output is connected to both Or circuits 53 and 49 to simultaneously actuate flip flops 40 and 41 to produce both W and E signals for controlling the panel erase sequence. This sequence is terminated at step 63 by signal 63 being fed to Or circuits 50 and 54 for resetting the flip flops.

During the write and erase sequences, it is necessary that the latches associated with the drivers be loaded in accordance with the data to be displayed or erased and that when the loading has been completed, that the further sequencing take place. As previously indicated, the signals from oscillator 30 are interrupted on steps 20 and 44 to allow this loading to take place. When the loading has been completed, a loading complete signal is fed to the set side of flip flop 60 whose output is connected as an input to And circuit 62. This circuit also receives an input from oscillator 30 and produces an output that through Or circuit 33 causes the counter BC to step to the next address. When steps 22 and 45 are reached in the respective sequences, signals S22 and S45 are generated and these are fed to Or circuit 63 having an output set to the clear side of flip flop 60 causing it to be reset and thereby discontinuing And circuit 62 while allowing the sequencing or timing signals to proceed in the normal fashion through time delay 31 and And circuit 32.

Tables 1–4, set forth below, partially describe the preferred sequences for operation of the apparatus for going through a sustain, write, cell erase and panel erase sequences respectively. In these tables, the steps corresponds to the step number shown in FIGS. 14–17 and provides a convenient means for distinguishing or designating the different steps. The state number is the same as that described previously with reference to FIGS. 4–7. The ROS input is a two digit decimal number representing the decimal equivalent of the binary numbers appearing at the input lines ROSAR 25. The first digit covers the respective bit lines 1, 2, 4 and 8 and the second digit covers the W and E lines. The first digit is expressed in hexadecimal characters. The ROS output is a two digit number representing the hexadecimal equivalence to the respective signals $H_{0A}$, $H_{0B}$, $_{H1A}$, $_{H1B}$, $V_{0A}$, $_{V0B}$, $V_{1A}$ and $V_{1B}$. The ROS input is generated by the sequencing control circuits shown in FIG. 13 and the ROS output represents the contents of ROS 23 as it would be located at the respective locations addressed by the ROS input. In the below tables, in the state column, D refers to the disconnect condition, L to a load state, E to the erase state and W to the write state. The tables are as follows:

TABLE 1

SUSTAIN SEQUENCE

| STEP | STATE | ROS INPUT | ROS OUTPUT |
|---|---|---|---|
| 0 | 5 | 00 | 66 |
| 1 | D | 10 | 00 |
| 2 | 10 | 20 | 99 |
| 3 | D | 30 | 00 |
| 4 | 6 | 40 | 69 |
| 5 | D | 50 | 00 |
| 6 | 9 | 60 | 96 |
| 7 | D | 70 | 00 |
| 8 | 5 | 80 | 56 |
| 9 | D | 90 | 00 |
| 10 | 10 | A0 | 99 |
| 11 | D | B0 | 00 |
| 12 | 6 | C0 | 69 |
| 13 | D | D0 | 00 |
| 14 | 9 | E0 | 96 |
| 15 | D | F0 | 00 |

TABLE 2

WRITE SEQUENCE

| STEP | STATE | ROS INPUT | ROS OUTPUT |
|---|---|---|---|
| 16 | 8 | 02 | 95 |
| 17 | D | 12 | 00 |
| 18 | 4 | 22 | 65 |
| 19 | D | 32 | 00 |
| 20 | L | 42 | 55 |
| 21 | W | 52 | 05 |
| 22 | W | 62 | 08 |
| 23 | W | 72 | 48 |
| 24 | W | 82 | 58 |
| 25 | W | 92 | 00 |
| 26 | W | A2 | 02 |
| 27 | W | B2 | 42 |
| 28 | W | C2 | 52 |
| 29 | D | D2 | 00 |
| 30 | 9 | E2 | 92 |
| 31 | D | F2 | 00 |

TABLE 3

CELL ERASE SEQUENCE

| STEP | STATE | ROS INPUT | ROS OUTPUT |
|---|---|---|---|
| 32 | 5 | 01 | 66 |
| 33 | 0 | 11 | 00 |
| 34 | 10 | 21 | 99 |
| 35 | D | 31 | 00 |
| 36 | 6 | 41 | 69 |
| 37 | D | 51 | 00 |
| 38 | 9 | 61 | 96 |
| 39 | D | 71 | 00 |
| 40 | 1 | 81 | 56 |
| 41 | D | 91 | 00 |
| 42 | 2 | A1 | 59 |
| 43 | D | B1 | 00 |
| 44 | L | C1 | 55 |
| 45 | E | D1 | 05 |
| 46 | L | E1 | 55 |
| 47 | D | F1 | 00 |

TABLE 4

PANEL ERASE SEQUENCE

| STEP | STATE | ROS INPUT | ROS OUTPUT |
|---|---|---|---|
| 48 | 5 | F3 | 66 |
| 49 | L | 03 | 55 |
| 50 | 10 | 13 | 99 |
| 51 | L | 23 | 55 |
| 52 | 6 | 33 | 69 |
| 53 | L | 43 | 55 |
| 54 | 9 | 53 | 96 |
| 55 | L | 63 | 55 |
| 56 | 5 | 73 | 66 |
| 57 | L | 83 | 55 |
| 58 | 10 | 93 | 99 |
| 59 | L | A3 | 55 |
| 60 | 6 | B3 | 69 |
| 61 | L | C3 | 55 |
| 62 | 9 | D3 | 96 |
| 63 | L | E3 | 55 |

FIGS. 14–17 illustrate the signals appearing on the H0, H1, V0 and V1 lower busses versus the signals at the cells C1–C4 as they would appear when the apparatus is cycled through the sustain, write, cell erase and panel erase sequences. For the buss signals, the small vertical line represents the disconnect condition of the circuits. The various sequences will now be described.

Sustain Sequence

Figure 18:
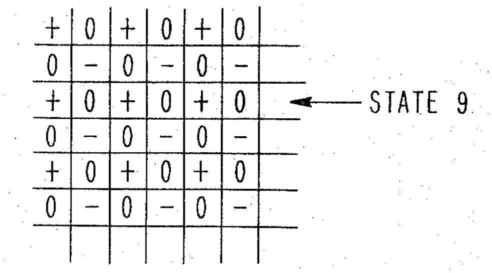
FIG. 18 is a schematic view similar to FIG. 3 showing the condition of a multiplicity of cells in an exemplary one of the different states.

When the display apparatus is in the sustain mode, it repetitively cycles through a series of sustain sequences until a command is received at which time, after step 15, the appropriate sequence is entered. At the end of such a sequence, the next step is always step 0 which leads into another sustain sequence and the start of the sustain mode. Within the diagrams, it should be noted that each cell is cycled twice through positive and negative sustain sequences. An important point to note is that the actual states used for the sequences are states 5, 10, 6 and 9. As seen in FIG. 7, each of these states is such that two diagonally opposite cells, for example, cells C3 and C2, are at a zero potential level and the remaining two are in positive and negative sustain potentials. The effect of using only these states is to halve the peak current for the driver on each line and at the same time provide electrostatic shielding or isolation of the cells. This can best be seen in FIG. 18 where several adjacent lines of the gas panel matrix and associated cells are shown. When the cells are biased to state 9, the condition of the respective cells as being either in a plus, minus or zero state, is shown in FIG. 9. Note that on each line, only half of the cells are in either a positive or negative sustain sense while the other half are neutral. This means that the peak current of the associated driver is directly proportional to only half of the number of lines. It should also be noted that for each cell that is in either a positive or negative sustain state, that all of the orthogonally adjacent cells are at a zero level and this provides the electrostatic isolation of those cells undergoing a sustain without the need for any interstitial grid work as disclosed in the aforementioned patent. The various other sustain states used in the sustain sequence bias the cells in a similar manner and need not be described in detail.

Write Sequence

The first part of the write sequence achieves a positive sustain sense for the panel so that half selects cannot cause erase problems. Step 20 then drives positive all the B suffix inputs previously described to reference the lower buss and allow loading of the latches as described in detail in the aforementioned application. This preconditions the panel drivers for subsequent applications of either select or half select on the upper or lower busses respectively. Through the operation of Or circuit 38 in FIG. 13 and the loading flip flop 60, the panel is held indefinitely in the load step until cleared by the load complete. In the case of write, the pulses are stretched for step 20 for loading and step 21 for the actual writing. During step 21, the circuitry in FIG. 12 is substantially disconnected on the horizontal side. The write logic first references the secondary of the transformer $T_W$ to positive $V_L$ through $Q_{WR}$ and then a write/erase pulse is applied to $Q_{WE}$. This creates half select level on H0 and H1 lower, a full select level on H0 and H1 upper, a pulse equal to the difference between half select and write on V0 upper and V1 upper. The lower busses are ground referenced to $Q_{B4}$ and $Q_{B6}$. The write sequence is completed by accomplishing a negative sustain in the four segments of the panel, each segment containing all of similar cells such as all cells C1. This is done by driving $V_0$ lower positive in step 22. Write reference is disengaged before the leading edge of this pulse to take the lower bus line to V plus V half select back biasing the diodes in the collectors of $Q_{H4}$ and $Q_{H7}$ respectively. $Q_{H4}$ and $Q_{H6}$ are then sequenced to ground. The $V_1$ section of the panel will go to –V half select, the diode in the collector of $Q_{B6}$ being backed biased to allow this. The horizontal side of the panel is returned to disconnect. The operation is then repeated for the V1 side of the panel entering steps 26–28. Steps 29 and 30 return the panel to a sustain state which then can be followed by the sustain sequence or a mode.

Erase Sequence

The cell erase function is similar to the write function. The first operations 32–42 achieve a condition where all previously written cells are sustained with a minus sense of sustain voltage. In step 44, the four lower busses are driven to ground and the oscillator voltage is interrupted for loading of the latches. Cell erase actually occurs in step 45. During erase, a reconnection of the panel to write/erase circuitry is accomplished by diode $D_E$ standing off the voltage that appears across the secondary line of TW. Step 46 can then be followed by a sustain sequence.

The panel erase function is accomplished by driving the cells through positive and negative erase steps of relatively short duration so as to allow any charge on the dielectrics to be dissipated below that which would cause cell firing. The erase pulses may be repeated a number of times to insure the dissipation of the charge and then the panel erase can be followed by the normal sustain sequence.

While the aforegoing description is directed to the application of the invention to a system having specific circuitry, it is to be understood that the invention is applicable to systems having drivers other than of the type described in detail herein. The drivers can be of any type which can be selectively controlled to provide for the electrostatic shielding and current minimization as previously described.

While the invention has been particularly shown and described with reference to preferred embodiments thereof, it will be understood by those skilled in the art that the above and other changes in form and details may be made therein without departing from the spirit and scope of the invention.

What is claimed is:

1. In a gas panel display device having a gas panel including a first plurality of first parallel lines and a second plurality of second parallel lines extending across said first lines and defining a multiplicity of illuminable cells, each cell further comprising panel means supporting said lines in spaced relationship, dielectric wall means overlying said lines, and an ignitable gas between said wall means, the combination of:

a plurality of selectively operated drivers each connected to a different one of said lines for selectively applying sustain, write and erase signals to operate said cells;

and means for controlling the operations of said drivers comprising sequencing control means operatively connected to selectively apply sequences of signals to said drivers for writing data representations into said cells, erasing said representations from said cells and sustaining representations within said cells, receiving means for receiving asynchronously command signals for initiating write and erase sequences, and cycle control means responsive to said receiving means for initiating write and erase sequences only at the end of a sustain sequence;

said cells being arranged in a first set and a second set with the cells of each set being located between the cells of the other set;

said sequencing control means being operative during a sustain sequence to sustain bias said first set of cells at one time and thereby fire any previously fired cells of said first set and to sustain bias said second set at another time and thereby fire any previously fired cells of said second set, whereby the peak current of each driver is proportional to the maximum number of cells in either of said sets along said line connected to each driver, said sequencing control means being further operative to bias one set to a neutral level while the other set is at a sustain level so as to electrostatically shield those cells undergoing a sustain bias, said sequence of sustain signals being such that at the end of a sustain cycle the wall charges associated with those cells of said first and second sets, which cells were fired during the sustain cycle, are at different states of positive and negative charges;

said sequencing control means being further operative during the beginning of each write cycle to apply a bias to certain ones of said cells at a given time and to apply a similar bias to the remaining cells at a different time, whereby all wall charges of all of the cells are in a predetermined state of charge before any data is written into such cells.

* * * * *